Patented Aug. 31, 1937

2,091,548

UNITED STATES PATENT OFFICE 2,091,548

METHOD OF TREATING ARGILLACEOUS SUBSTANCES AND PRODUCTS THEREOF

Harold L. Kauffman, Warren, Pa.

No Drawing. Application August 28, 1934, Serial No. 741,869

15 Claims. (Cl. 252—2)

This invention relates to improvements in methods of treating argillaceous substances, for example, porous argillaceous substances, and to the products thereof. More specifically, it relates to improvements in methods of, and products resulting from treating porous argillaceous substances such as oil-decolorizing-clay substances (for example, fuller's earths, neutralizing clays, and the like) with an elastic fluid such as steam and at a relatively high pressure so as, for example: (1) to remove from the pores of the particular argillaceous substance undergoing treatment objectionable water-soluble and other impurities that lessen the value and usefulness of the untreated substance, for example, when the starting argillaceous substance is an oil-decolorizing-clay substance, one effect of the treatment is to remove from the pores of the oil-decolorizing-clay substance those water-soluble and other impurities that detrimentally affect the adsorptive (e. g., decolorizing) power or capacity of the oil-decolorizing-clay substance and whereby there is obtained an improvement in the adsorptive power or capacity of the oil-decolorizing-clay substance that is so treated; (2) to effect changes in the physical structure and chemical composition of argillaceous substances, for example, oil-decolorizing-clay substances, whereby there may be obtained clay substances of increased plasticity, of increased colloidality, and with still other changes in their physical structure, so that the new and novel end-products of my improved methods of treating argillaceous substances become suitable for use and may be employed for purposes for which the natural or untreated argillaceous substance, for example, oil-decolorizing-clay substance, is either not fitted at all or is fitted for a particular use or uses only to a limited degree.

Heretofore efforts to increase the plasticity and colloidality, and otherwise to alter the physical properties of argillaceous substances that were either non-plastic or semi-plastic, or low in content of amorphous or colloidal constituents, or for other reasons unfitted for a particular use by reason of their particular and peculiar physical characteristics when in a natural state—such efforts have involved chiefly the treatment of the particular argillaceous substance with water. Treatment in this manner has been slow, and, in the case of many argillaceous substances, totally ineffective. For example, flint clay cannot be slaked down by the action of very hot water in any reasonable period of time; nor is very hot water effective in affecting the plasticity of raw clays.

Heretofore it has been possible to rehydrate clays that had been almost completely dehydrated by calcination at 1112° to 1292° F. by heating with hot water for from 8 to 48 hours, but the clay had to be worked and dried and re-treated two to three times with a fresh quantity of hot water in order to put the clay in such condition that it resembled raw clay. Such a mode of treatment was too expensive ever to be commercially practical. Hence there has not heretofore been any economical method of treating calcined clays, which are a waste product of many ceramic and other industries where calcination is an essential step in the process of manufacture, in order to rehydrate them, or to increase their plasticity or their colloidalness, or otherwise to improve or to recondition them so as to make them suitable for re-use in that particular industry or so as to fit them for use for other purposes. By the practicing of my invention that which heretofore it was impossible to accomplish either at all, or it was impossible to accomplish economically, by the treatment of argillaceous substances with hot water, it is now possible for one to accomplish economically and effectively.

One object of this invention is to increase the plasticity of non-plastic or semi-plastic argillaceous substances, for example, non-plastic or semi-plastic porous argillaceous substances such as non-plastic or semi-plastic oil-decolorizing-clay substances (e. g., fuller's earths, neutralizing clays, and the like).

Another object of this invention is to improve the colloidal properties and characteristics of a non-colloidal or semi-colloidal argillaceous substance, for example, a non-colloidal or semi-colloidal porous argillaceous substance such as a non-colloidal or semi-colloidal oil-decolorizing-clay substance, by changing all or the larger proportion of the crystalline grains, particles or bodies normally present in the particular non-colloidal or semi-colloidal argillaceous substance into amorphous or colloidal clay substances.

Another object of this invention is to rehydrate substantially completely a partly or substantially completely dehydrated argillaceous substance, for example, a partly or substantially completely dehydrated porous argillaceous substance.

Another object of this invention is to rehydrate substantially completely a calcined oil-decolorizing-substance, for example, a calcined fuller's earth.

Another object of this invention is to improve the adsorptive (e. g., decolorizing) power of oildecolorizing-clay substances such as fuller's earth and the like.

Another object of this invention is to increase the field of utility of porous argillaceous substances such as oil-decolorizing-clay substances.

Another object of this invention is to utilize the fine dust that is formed during the manufacture of granular oil-decolorizing-clay substances, a large proportion of which dust is now wasted and which therefore adds to the cost of producing one ton of granular oil-decolorizing-clay substance, and to obtain useful products therefrom.

Another object of this invention is the preparation of a clayey substance with physical characteristics similar to bentonite and which therefore is suitable for use for many, if not for all those purposes for which bentonite is now commonly employed.

Still other objects of this invention will be apparent to those skilled in the art.

By an argillaceous substance, I means a substance that is of the nature of clay; of or containing clay; clayey. Within this definition are therefore included clays of all kinds and types, as well as clay- or clay-like minerals and rocks. By porous argillaceous substances I mean argillaceous substances having a porous or cellular structure and which therefore have a much greater internal surface area than argillaceous substances which are not porous or cellular in their physical structure. By the term "oil-decolorizing clays" or the term "oil-decolorizing-clay substances", I mean those clays, clay-like minerals or clay-like rocks of porous or cellular structure and of high adsorptive power or capacity, which substances, either in their raw or natural state or after chemical or other treatment and/or after drying partially, grinding and screening or otherwise separating into particles of the desired size, have such power or capacity to decolorize and otherwise purify and improve vegetable and animal oils, fats and waxes (e. g., mineral waxes), and petroleum hydrocarbon oils, that they find, in that state and form, wide use for such purposes in industry.

My definition of fuller's earth, which is a specific type of oil-decolorizing clay, is that given in Bureau of Mine's publication, "Fuller's Earth in 1931" (Mineral Resources of the United States, 1931, Part II, published October 5, 1932). Most of the fuller's earth that is mined at present in the United States is obtained from the States of Florida and Georgia. In these states the earth is found chiefly in Decatur, Twiggs, Baldwin, Houston, Jefferson, Randolph, Screven, Washington and Wilkinson counties, Georgia; and in Gadsden, Marion, Manatee and Hernando counties, Florida. Such fuller's earths all have highly porous or cellular structures; weigh (depending upon the particular deposit and section thereof) from about 28 to about 42 pounds per cubic foot; and are, for the most part, quite similar otherwise in their general physical properties and characteristics. Fuller's earth from this locality is therefore generally designated as "Florida fuller's earth," and when I hereinafter use the term "Florida fuller's earth" I mean the particular and peculiar kind or type of fuller's earth that is found in the locality immediately hereinbefore described.

"Neutralizing clays" are another type of oil-decolorizing clay. Classed as such are certain natural clay-like mineral substances that are deficient, although not completely lacking, in their power to decolorize oils, but which have marked affinity for the free mineral acid present in oils that have been treated with sulfuric acid by the petroleum refiner as a step in the process of manufacture, and incidentally decolorize such oils to a limited degree while neutralizing them. Clays of this type are mined in large quantities in Texas.

As examples of argillaceous substances that I may treat by my new and improved process for one or more of the objects hereinbefore stated, I mention the following: kaolins of all kinds and types, refractory bond clays, fire clays, sagger clays, stoneware clays, terra-cotta clays, sewer-pipe clays, paving-brick clays, brick clays, fire-proofing and hollow-brick clays, roofing-tile clays, slip clays, oil-decolorizing clays such as fuller's earth, neutralizing clays and the like, as well as still other clays. Examples of pure or impure clay minerals that I may treat with an elastic fluid such as steam and at a relatively high pressure in order to improve and to increase the field of utility of such clay minerals are: kaolinite, indianaite, leverrierite, beidelite, smectite, halloysite, pyrophyllite and the like. Since this invention may be used for treating a great variety of argillaceous substances in order to purify them, or to increase their plasticity, or to make them more colloidal, or otherwise to alter their physical properties and to increase their field of usefulness, it is emphasized that the argillaceous substances and clay minerals immediately hereinbefore mentioned are merely examples of clay, clayey or clay-like substances that I may treat, and it is intended to be understood that there is covered and included within the scope of this invention the treatment, with an elastic fluid such as steam (as will hereinafter be described), of any and all argillaceous, earthy or clayey substances that are like or similar to the substances just mentioned by way of example or that are the equivalent of any of such substances.

A brief description of one method of practicing my invention is as follows: The starting argillaceous substance (for example, oil-decolorizing-clay substance such as fuller's earth, neutralizing clay or the like) is mined and then, preferably, although not necessarily, it is air dried or otherwise partly or completely dried, but preferably it is dried at least to such a state that it may be crushed into pieces less than two inches in size, preferably less than one inch in size, for example, about one-half inch in size or thereunder. The crushed or ground argillaceous substance is then treated, in any suitable apparatus, with high-pressure elastic fluid or fluids, for example, with steam, air or other gas, or with steam followed by air or other gas, and preferably such treatment is thereafter followed by rapid discharge of the argillaceous substance from the pressure chamber into a region of relatively reduced pressure, with resulting liberation of pressure. Any suitable end-pressure above about 200 pounds per square inch may be employed. The particular pressure or pressures employed vary with the particular starting argillaceous substance and with the particular change or changes in the structure of the substance treated that it is desired to effect by that treatment. In all cases, however, an end-pressure above about 200 pounds per square inch is employed, preferably, in most cases, above about 350 pounds per square inch, for example, an end-pressure ranging between about 500 and 1500 pounds per square inch. End-pressures above about 1500 pounds per square inch may be used if desired, but such higher pressures require the use of more costly equipment and operating costs tend to be higher. The use of pressures above about 1500 pounds per square inch does not, however, detrimentally affect the quality of the end-products. The operation may be conducted in apparatus designed for batch operation, or for semi-continuous (that is, intermittent) operation, or for continuous operation. For purposes of economy I prefer, however, whenever practical, to use equipment designed for continuous operation, although I do not wish to limit myself to the use of such equipment and I may, when it appears advantageous for one reason or another so to do, use equipment designed for batch or for semi-continuous operation. Preferably, too, the argillaceous substance is initially preheated with the elastic fluid such as steam before it is subjected to the end-pressure that has been found by experiment to be most effective in the treatment of the particular starting argillaceous substance. For example, in treating a calcined argillaceous substance such as finely divided calcined fuller's earth of 100 mesh (and finer) particle size, the fuller's earth may be initially preheated by subjecting it to the action of, for example, steam at, for example, about 200 pounds per square inch pressure for, for example, from about 30 seconds to one minute or thereabove, and then quickly subjecting it to the action of, for example, steam at a higher pressure, for example, a pressure of about 1000 pounds per square inch, for a shorter period of time, for example, for about 5 seconds. The treated substance may be used, if desired, in the form in which it is discharged from the pressure chamber for such purposes for which it may be fitted when in that state and form; or the excess moisture that results from the condensation of the steam or from water that may be brought into contact with the steam-treated substance subsequent to the steam treatment proper—such excess moisture may be removed from the treated substance by any one or another or a combination of such means as the following: settling, centrifuging, pressing, by the application of direct or indirect heat or by air drying, or by any other means or combination of means; and, if desired, prior to reducing the steam-treated substance to the moisture content desired in the end-product, said treated substance may be molded or shaped into any desired form by any suitable means of compressing the same, for example, by the pressure of rolls, by extruding it through a small orifice under pressure, and by like or similar means that will result in the obtainment of an end-product of the desired form or shape. The molded mass of earthy substance is then further dried, baked and calcined or roasted to obtain an end-product of the desired physical and other characteristics.

I may, as hereinbefore stated, use any suitable apparatus for practicing my invention. As an example of one form of apparatus that I may use, I mention the apparatus described and claimed by William H. Mason in U. S. Patent Number 1,578,609 (five pages of specification and one page of drawing), "Processes and apparatus for disintegration of wood and the like," issued March 30, 1926. This apparatus, which as hereinbefore stated is one form of apparatus that is suitable for my use, consists of a pressure chamber or so-called "gun" that is in the form of a cylinder and which has a suitable feed opening for receiving the charge, that is to say, as I use the apparatus, a charge of argillaceous substance, for example, a charge of dried or calcined oil-decolorizing-clay substance such as fuller's earth and the like, which charge of argillaceous substance may be in the form or state in which the substance is found when mined, but preferably it is in either finely divided (or powdered) form or in the form of partly dried pieces of about two inches in size or thereunder. After the gun has been so filled, the opening is closed and high pressure steam (or other elastic fluid) is admitted to the cylinder. After a short time a discharge port is opened and the treated substance is forced out by the steam into a suitable receptacle. The operation is intermittent or semi-continuous. The high-pressure steam is kept turned on during the discharge of the argillaceous substance from the pressure chamber or gun until the sound of the steam escaping from the discharge opening has acted as a signal to the operator that the gun has been emptied of the argillaceous substance, whereupon he shuts off the steam and thereafter introduces a fresh charge of argillaceous substance into the pressure chamber.

If, for example, calcined 100 mesh (and finer) Florida fuller's earth (earth of which particle size is more or less a waste product in the production of granular Florida fuller's earth) be placed in apparatus of the kind or type immediately hereinbefore described and be initially preheated by subjecting it to the action of steam at a pressure of about 200 pounds per square inch for, for example, about 30 seconds or longer, and then be quickly subjected to the action of steam at a higher pressure, for example, a pressure of about 1000 pounds per square inch or thereabove, for a shorter period of time, for example for about 5 seconds or longer, and if thereafter the discharge port be opened and the treated fuller's earth be forced out of the gun by the steam into a suitable receptacle, it will be found that the action of the high-pressure steam on the calcined, finely divided fuller's earth has completely changed and altered the physical characteristics and chemical composition of the starting calcined fuller's earth. The starting fuller's earth is non-plastic, substantially non-colloidal, and partly dehydrated, and possesses little commercial utility except for its possible use in the so-called "contact-filtration" process of treating oils, but for which purpose there is now little market demand for such powdered fuller's earth. The steam-treated fuller's earth, however, whether in the form of a slurry containing from 10 to 30% solids or in the form of a plastic or semi-plastic mass containing from 40 to 70% water, or when of any intermediate or other moisture content as discharged from the apparatus, contains clayey substance that is very plastic, highly colloidal, substantially completely rehydrated and, in many, if not in all instances, of improved adsorptive power or capacity. The improvement in adsorptive power or capacity is due, for one reason, to the removal from the pores of the fuller's earth those soluble and fusible (that is, fusible upon the application of heat) substances that tend to decrease the adsorptive power of the earth when the earth is employed for the first time in, for example, the decolorization treatment of oils, and especially when the earth is used a second time (or any other number of times) after having been revivified previously by a calcination process. The steam-treated fuller's earth when in, for example, plastic form is much like the gel-type bentonites found in certain parts of Wyoming and has a great variety of uses, being suitable for use for almost, if not for all purposes for which bentonite is now commonly employed, for example, as a filler, binder or plastic, in the ceramic field, in the Portland cement industry, in road building and other highway and building construction work, in foundry work as a bonding agent for molding sands, as a constituent of putty, polishes, soaps, detergents, paste, glue, size, pencils, leads, crayons pastel colors, horticultural sprays animal dips, insecticides, fungicides, paints, enamels, inks. wood dips, roofing and water-proofing preparations, cosmetics, medicaments, pharmaceutical preparations, for de-inking newspapers, and for a great variety of still other uses. It is therefore obvious that the steam-treated fuller's earth may properly be designated as a "bentonite substance".

In practicing my invention in apparatus of the type hereinbefore described as an illustrative example of apparatus that is suitable for my use, and when I use pressures over about 400 pounds per square inch in the treatment of certain argillaceous substances, for example, certain non-plastic and non-colloidal refractory clays, flint clays and other hard and non-plastic clays as found in nature, a substantial change in the physical structure of which by means of a single subjection to the action of, for example, high-pressure steam is more or less difficult, the argillaceous substance is then preferably subjected to successive treatments with the high-pressure steam in order completely to change the physical structure of the said substance. If desired, similar successive treatments with high-pressure steam may be employed when even higher pressures are used. Likewise, if desired, the successive treatments of the argillaceous substance with high-pressure steam may be done at an increasing end-pressure. For example, the first high-pressure steam treatment may be at an end-pressure over about 200 pounds per square inch and under about 400 pounds per square inch; the second steam treatment may be at an end-pressure over about 400 pounds per square inch and under about 600 pounds per square inch; a third steam treatment, if required, may be at an end-pressure over about 600 pounds per square inch and under about 800 pounds per square inch; and a fourth steam treatment, if required, may be at an end-pressure over about 800 pounds per square inch and under about 1000 pounds per square inch. In the treatment of argillaceous substances that are more resistant to the action of high-pressure steam in altering their physical structure, successive high-pressure steam treatments accomplish, among other effects, a more complete and more uniform change in the physical structure of that substance.

In all cases, a hot, elastic, high-pressure fluid composed of or containing water vapor, for example, steam of a pressure of at least about 200 pounds per square inch is preferably used at least at the beginning of the operation, since the action of the high-pressure steam on the argillaceous substance is beneficial in cleansing the substance and, if said substance is partly or completely dehydrated, is effective in substantially completely rehydrating it, which rehydration, for a reason or for reasons that are not clearly understood by me, seems to be closely allied with an improvement in the plasticity and in increasing the colloidality of said argillaceous substance.

When, for one reason or another, it appears advantageous to supply additional pressure over about 200 pounds per square inch, for example, when it appears advantageous to supply additional pressure over about 300 pounds per square inch, instead of using steam said additional pressure (which pressure, depending upon the particular argillaceous substance that is being treated and the particular changes in its physical structure that it is desired to effect, may range, for example, from about 100 to about 1300 pounds per square inch over and above the maximum steam pressure used in preheating said substance) may be supplied by means of some other elastic fluid than steam, for example, the additional pressure may be supplied by means of compressed air, which may be used at a relatively low temperature, being in this respect unlike steam, which, when used at a high pressure, is always accompanied by a corresponding high temperature. Under certain conditions the use of a different elastic fluid than steam (such as hot or cold compressed air or other hot or cold elastic fluid that is substantially free from water vapor), in obtaining a higher pressure than that steam pressure above about 200 pounds per square inch to which the argillaceous substance was first or initially subjected, may, for various reasons, be more economical, or conducive to better operating results, or it may more completely or quickly alter the physical structure of the argillaceous substance that is so treated, or for still other reasons it may be more suitable for use than high-pressure steam alone.

When the type of apparatus hereinbefore described is employed, it is obvious that a number of the pressure chambers or so-called "guns", together with auxiliary equipment, may be arranged in a battery so as to obtain almost continuous operation. Likewise, when desired, such a battery of guns may be employed for obtaining a succession of treatments of the same argillaceous substance under varying temperature, pressure or other conditions.

Further in reference to the mode of operation when the type of apparatus hereinbefore described is employed:

Having placed the crushed or ground argillaceous substance, for example, oil-decolorizing-clay substance, in the pressure chamber, with or without the addition of a small quantity of water (preferably hot water)—and parenthetically it may be stated that whether or not such water is added to the pressure chamber along with the argillaceous substance, and the amount thereof, will depend upon the moisture content of the particular argillaceous substance that is to be treated and the particular and peculiar characteristics desired in the end-product—then hot elastic fluid such as steam is turned into the chamber or gun and, with all inlet and outlet openings closed, the contents of the chamber is subjected to a steam pressure of at least 200 pounds per square inch. After the pressure has been maintained for a sufficient time to permit the steam under pressure to penetrate the argillaceous substance and establish a substantial balance between internal and external pressure and temperature within and around the argillaceous substance, and to heat the moisture within the argillaceous substance to a temperature which will cause it to turn to steam upon release of pressure, an outlet valve of comparatively small dimension, as compared to the cross-section dimension of the main chamber, is opened. The pressure within the chamber causes the argillaceous substance to be forcibly and progressively driven out through the valve opening, which may be and preferably is somewhat smaller in at least one dimension than the largest dimension of the pieces of argillaceous substance introduced into the chamber. More or less compression of the argillaceous substance as it passes the outlet appears to be useful in obtaining the best results, that is to say, in obtaining a thoroughly homogeneous, very plastic, highly colloidal, substantially completely rehydrated argillaceous substance. During this progressive discharge the steam pressure, or other source of pressure, preferably is kept turned on and the pressure within the chamber also is maintained as far as possible, although there may be some reduction in pressure toward the end of the progressive discharge. By conducting the operation in this manner, the last part that is discharged from the chamber possesses substantially the same physical and other characteristics as that which was discharged earlier. Regardless of the size of the individual particles or pieces of argillaceous substance as charged to the pressure chamber, the pieces or particles of argillaceous substance as they progressively emerge from the pressure chamber are completely altered in their physical properties, probably by reason of the excess of internal pressure over external pressure, which latter may be substantially atmospheric pressure. As a result of this treatment, the treated argillaceous substance becomes and is suitable for uses for which the starting argillaceous substance is not fitted, all as has hereinbefore been fully set forth at length.

When apparatus of the kind hereinbefore described is employed in the practicing of my invention, use of a constricted outlet port and of a balanced slide valve in connection therewith are of great advantage in securing a progressive discharge and in distributing the expenditure of released pressure over a comparatively long interval of time. In this way it becomes possible to make use of a pressure sufficiently high to secure effective disruption, among other effects, of the argillaceous substance upon release, and no substantial difficulties are encountered in the way of securing the gun against recoil or in the way of controlling or maintaining the valve such as would be encountered, for example, with large area valves operating to release the pressure substantially simultaneously throughout the chamber.

If desired, the treated argillaceous substance may be discharged from the pressure chamber directly into a tank or body of water. Or, if desired, a conduit leading from the bottom discharge opening of the pressure chamber may extend into contact with an annular source of water supply, whereby practically an injector action is effected, which forcible contact of the water with the high-pressure-steam-treated argillaceous substance results in its being made completely uniform (if previously it was not thoroughly homogeneous), and more colloidal and more plastic. The argillaceous substance is discharged in the form of a slurry or semi-plastic mass into any convenient tank or apparatus. In this case the steam is condensed on contact with the injector water. Or, if desired, a conduit leading from the bottom discharge opening of the pressure chamber may extend to any suitable type of centrifugal separator, in which the steam or other expanding gas is discharged upward, while the argillaceous substance, discharged tangentially, falls to an outlet chute and may be carried away either to storage or to another pressure gun or other apparatus. In these or other ways the energy of the argillaceous substance discharged at high velocity may be utilized to assist in obtaining a highly colloidal, very plastic, thoroughly homogeneous, substantially completely rehydrated argillaceous substance possessing a wide field of utility.

As an example of still another form of apparatus that I may use, I mention the apparatus described and claimed by William H. Mason in U. S. Patent Number 1,922,313 (six pages of specification and two pages of drawings), "Process and apparatus for disintegration of material," issued August 15, 1933. By the use of the apparatus described in that issued patent the process of treating porous or non-porous argillaceous substances such as crushed, partly dried oil-decolorizing-clay substances (e. g., crushed, partly dried fuller's earth), finely divided fuller's earth (e. g., calcined Florida fuller's earth of 100 mesh fineness and upwards), crushed flint and refractory clays, and like or similar argillaceous substances, with a hot elastic fluid such as steam under a pressure at or above, for example, about 200 pounds per square inch, preferably, in most cases, above about 350 pounds per square inch (e. g., an end-pressure ranging between about 500 and 1500 pounds per square inch), may, if desired, be carried out continuously, with numerous advantages in so doing, for example, lower operating costs and the obtainment of an increased output with a reduction in labor cost. When using this apparatus in the treatment of argillaceous substances with high-pressure steam, the particular argillaceous substance that is undergoing treatment is, as it is fed into the gun or pressure chamber, subjected to sufficient mechanical pressure to overcome the pressure of the steam within such chamber, which pressure, together with the frictional resistance of the argillaceous substance, results in a substantial and effective compression of said argillaceous substance and with a number of advantages therein, for example, further reduction in particle size, a more homogeneous starting substance, and with still other advantages. Among the other advantages in the use of this apparatus in the treatment of argillaceous substances with high-pressure steam may be mentioned the following: Better control of the quality and quantity of the product of the steam treatment; greater ease in using the discharged or exhaust steam for other purposes; the starting argillaceous substance may be continuously preheated.

Reference is here again made to U. S. Patent Number 1,922,313, issued August 15, 1933, to William H. Mason. It is noted that in the apparatus therein described (and illustrated with two pages of drawings) the gun which contains the pressure chamber is in the form of a horizontal cylinder having a steam supply pipe that is fitted with a control valve or throttle as well as with a pressure gauge. The steam supply pipe likewise has a similar gauge. The horizontal pressure cylinder is also fitted with a water inlet or supply pipe and this water-inlet pipe is provided with a control valve. The horizontal pressure cylinder is formed with an integral flange at each end and a depending branch extending from the bottom thereof and at right angles thereto, which depending branch is provided with an integral flange, to which integral flange is bolted a hopper-shaped member (having top and bottom flanges). A valve block having a flange is bolted to the bottom flange of the aforesaid hopper-shaped member. This block is formed with a vertical bore and with a tapered discharge outlet having an axis at right angles thereto. A discharge pipe is threaded in the bore of the discharge outlet and communicates with a large pipe for carrying away the discharged argillaceous substance. This discharge pipe preferably leads to a cyclone separator of well-known construction, which separator has a lower outlet for discharging the steam-treated argillaceous substance and a pipe leading from the top of said separator that forms an outlet for the exhaust steam. This steam-exhaust pipe leads to a condenser of any desired type, for example, a water jet condenser fitted with suitable water-supply pipes and with an outlet. Instead of the cyclone separator and condenser, a structure such as shown in Fig. 6 of U. S. Patent Number 1,922,313 may be used. In such a device the discharge pipe that is threaded in the bore of the discharge outlet of the hereinbefore described pressure chamber is connected to the nozzle of a barometric condenser of known construction. The vertical pipe of this condenser is supplied with water through a suitable pipe connection, while another pipe discharges the mixture or slurry of argillaceous substance into a suitable tank, the contents of which are maintained at a proper level by means of a rotary pump. The advantage of the use of this device is that the steam is all condensed in the discharge pipe of this device, as a result of which the pressure of the discharged or exhaust steam approaches zero instead of atmospheric pressure, and the effective range of steam pressure is thereby increased. The volume of the exhaust steam as its pressure falls below atmospheric pressure increases very greatly.

Within the hereinbefore-mentioned vertical bore of the valve block is a fixed sleeve, within which sleeve is a rotatable-mounted cup. This fixed sleeve has a port and another port is formed at the base of the wall of the rotatable-mounted cup so as to register with the port in the fixed sleeve when the cup is in the position shown in Fig. 3 of U. S. Patent Number 1,922,313. Suitable means are provided for operating the cup to open and close the valve. The rotatable cup is preferably formed with a plurality of ports of different heights, each of which at will may be brought into alignment with the port in the fixed sleeve, whereby the valve is adapted for operating upon argillaceous substances of different lump or partial sizes. The fixed sleeve is also preferably provided with additional ports of the same or of a different size, with the same advantages as in the case of the rotatable cup. In all cases the arrangement of the valve ports is such as to permit of variation in the width and height of the discharge opening. The size of the discharge opening to be used depends upon the size of the pieces or particles of argillaceous substance charged to the pressure chamber and upon the steam pressure that is employed. The use of a long and narrow opening is advantageous in preventing clogging. The smaller the average size of the pieces or particles of argillaceous substance, the narrower should be the opening. In starting the process, the opening may be made larger than is necessary and then during the operation its area may be reduced.

In operation of the process, the rotatable cup should be turned to a position to form an opening of the minimum width suitable for use with pieces or particles of argillaceous substance of the size to be treated.

Better results are generally obtained when treating an argillaceous substance with high-pressure steam if said substance is first initially preheated by any suitable manner and in any suitable apparatus, but preferably by subjecting it to the action of a hot elastic fluid such as steam at a pressure of, for example, about 200 pounds per square inch, in a suitable pressure chamber. This pressure chamber, if desired, may be the same chamber in which the argillaceous substance, after the initial preheating period, is later subjected to a substantially higher pressure, for example, an end-pressure ranging between about 500 and 1500 pounds per square inch, than that pressure to which the argillaceous substance was initially subjected for the purpose of preheating it; or, if desired, the argillaceous substance may be initially preheated by treatment with steam or by other means in a separate pressure chamber or other receptacle prior to charging it to the gun or pressure chamber in which it is subjected to the maximum pressure of the treatment. Water or other fluid may, if it appears advantageous so to do, be added to the argillaceous substance either before or after the initial preheating treatment. Preferably, if separate preheating apparatus is employed, such apparatus is so connected with the discharge opening of the pressure chamber (in which the substance is subjected to the maximum pressure of the treatment) that the steam which is discharged along with the treated argillaceous substance through said discharge opening may be effectively and economically utilized in preheating said substance. In some cases the preheating of the argillaceous substance is not particularly advantageous and it may therefore be dispensed with, in which case the starting argillaceous substance may be fed directly to the treating apparatus.

Further in reference to the apparatus described and claimed by W. H. Mason in U. S. Patent Number 1,922,313, and which is illustrative of another form of apparatus that is suitable for use in practicing my invention, and with particular reference to the means employed in the use of that apparatus in mechanically forcing the argillaceous substance into the pressure chamber or gun in which said substance is subjected to the action of a hot elastic fluid such as steam, I mention the following:

Near the end of the apparatus opposite that end in which the horizontal pressure chamber is located is an opening through which is charged the argillaceous substance that is to be treated. The pressure screw casing (in which is placed the opening just mentioned for charging to the apparatus the argillaceous substance to be treated) comprises a body and a removable cover plate bolted thereto, which cover plate is formed with a feed opening that communicates with a hopper containing the argillaceous substance to be treated. The body of the casing is formed at one end with a flange, and the cover plate is also fitted with a similar flange. A bearing block is bolted to these flanges just mentioned, which bearing block is provided with a journal bearing for the shaft of a horizontal pressure screw. A thrust roller bearing is interposed between this bearing block and the shaft of the horizontal pressure screw. A thrust member which is secured to the shaft of the horizontal pressure screw, is grooved to receive a retaining plate, which is removably secured to the hereinbefore mentioned bearing block. The horizontal shaft of the pressure screw extends beyond the bearing block just mentioned and is provided with a sprocket which is keyed thereto and may be driven from any suitable source of power. This shaft is provided with a spiral blade or ribbon to enable it to convey and compact the argillaceous substance supplied thereto through the hereinbefore mentioned feed opening. The spiral blade turns in a bushing which lines the pressure screw casing. A number of small apertures extend entirely through the body of the pressure screw casing and through the bushing which lines said casing in order to permit the escape of any water that may be expressed from the argillaceous substance undergoing treatment as it is compressed by the action of the pressure screw. In order to prevent the argillaceous substance from rotating with the pressure screw, it is desirable to provide the body of the pressure screw casing with a series of stops which are rigid therewith and which extend inward into proximity with the horizontal shaft, the screw blade or ribbon being cut into sections to enable it to clear the said stops. The forward end of the body of the pressure screw casing is formed with a flange which is bolted to a flange of the steam pressure chamber in which the argillaceous substance is subjected to the maximum pressure of the treatment. The forward end of the body of the pressure screw casing is formed with a bore within which is a bushing. A horizontal screw conveyer is mounted within the horizontal portion of the steam pressure chamber. This conveyer may be termed the preheating screw, inasmuch as its length and speed are so designed as to cause the argillaceous substance that is being treated to be heated by steam within such chamber for a definite period of time sufficient to thoroughly penetrate and heat said argillaceous substance before it drops to the discharge portion of such chamber. The forward end of the shaft of the preheating screw is journaled in a bearing carried by a head block and extends thence through a stuffing box to the exterior, at which point a sprocket is mounted thereon for driving the same at any desired speed, which speed may be varied in any desired manner for obtaining the most effective results. If desired, the rear end of the screw conveyer shaft may be provided with a socket or bearing to receive the end of the horizontal shaft of the pressure screw that is present in the pressure screw casing. Also, if desired, the so-called "preheating screw" may be so designed that it may be rigidly united to the shaft present in the pressure screw casing and may be driven thereby, thus dispensing with the drive sprocket and stuffing box and the central opening in the head block mentioned a few lines hereinbefore.

When this type of apparatus is employed in the practicing of my invention, the process may be carried out in the following manner:

The argillaceous substance to be treated (for example, natural or crushed flint clay, natural or crushed refractory clay, natural or crushed oil-decolorizing clay, partly dried fuller's earth in pieces smaller than two inches in size, calcined fuller's earth (e. g., calcined Florida fuller's earth) of and in a finely divided condition, that is to say, of finer than 100 mesh particle size) is preferably preheated by any suitable means, although not necessarily so, and is fed by any suitable means into the pressure screw casing through the opening therein hereinbefore described. If finely divided argillaceous substance, for example, 100 mesh (and finer) fuller's earth, is the substance regularly to be treated, then there are no apertures in the body of the pressure screw casing and in the bushing that is within said casing. The pressure screw shaft is continuously rotated, which rotation causes the argillaceous substance to move forward toward the steam pressure chamber. Such movement is opposed by the steam pressure, with the result that sufficient pressure must be imparted to the argillaceous substance by the pressure screw to overcome such steam pressure plus the resistance due to the friction of the argillaceous substance on the pressure screw, casing and stops. The result of these opposing forces is that the argillaceous substance forms a plug of considerable length within the bushing that is within the bore located at the forward end (end nearest the steam pressure chamber) of the body of the pressure screw casing. As fresh argillaceous substance is being added continuously to the rear of this plug of argillaceous substance, a mass of argillaceous substance is therefore being continuously detached from the forward end of the plug and is fed along the horizontal portion of the steam pressure chamber or gun by the preheating screw which is located within said chamber. The argillaceous substance that forms the plug is, in most cases, very compact and dense by reason of the pressure to which it has been subjected and acts as combined means for rotatably supporting the pressure screw shaft and preventing flow of steam from the steam pressure chamber into the pressure screw chamber. When the character of the argillaceous substance is such that the argillaceous plug is not sufficiently compact and dense as to prevent the flow of steam from the steam pressure chamber into the pressure screw chamber, then apparatus of different design than that hereinbefore described must be employed, that is to say, the apparatus must be so designed that continuous feed of the argillaceous substance to the steam pressure chamber is possible without any substantial escape of steam from the steam pressure chamber or gun into the pressure screw chamber. As the argillaceous substance enters the steam pressure chamber it absorbs high pressure steam. The preheating screw carries the argillaceous substance forward for a short period, which may vary with the particular steam pressure employed and with the particular kind of argillaceous substance that is being treated and with the particular and peculiar characteristics desired in the end-product. If the substance has been separately preheated by subjecting it to the action of steam under a pressure of at least about 200 pounds per square inch, in separate preheating apparatus, for a short period of time, for example, for from about 20 seconds to about one minute, then when substantially higher pressures are employed in the main steam pressure chamber, for example, end-pressures ranging between about 500 and about 1500 pounds per square inch or thereabove, good results may be obtained by the use of periods of time ranging from about one second to about fifteen seconds during which the argillaceous substance is subjected to the action of the maximum pressure of the steam treatment. In certain cases it is desirable to introduce a small quantity of water into the steam pressure chamber. As the argillaceous substance reaches the end of the blade of the preheating screw, it falls into the vertical portion of the steam pressure chamber where it is brought into the path of and caught by the rush of escaping steam and forced therethrough in a continuous stream through the valve ports, which always remain open during normal operation of the apparatus. As the substance emerges from said ports into a region of substantial atmospheric pressure, that is, into the discharge pipe leading from the discharge opening of the apparatus, the expansion of the high pressure steam contained within and around the argillaceous substance, together with any steam which may be generated from the water content of the argillaceous substance, explosively and very thoroughly disrupts the argillaceous substance, and completely alters the physical characteristics of the said substance, so that the product of the treatment is very plastic, highly colloidal, free from water-soluble impurities and, if an oil-decolorizing-clay substance, of improved adsorptive (e. g., decolorizing) power or capacity. If the starting argillaceous substance was partly or substantially completely dehydrated, the end-product of the treatment is substantially completely rehydrated. The discharged and steam-treated argillaceous product may, if required, be given further high pressure steam treatment in the same or other apparatus of like or similar design; or with or without further admixture with water or other fluid it may be used directly for such purposes as hereinbefore have been fully set forth at length, or it may be transferred to other apparatus and processed in such apparatus to obtain end-products of the desired physical and other properties and characteristics; for example, if not already a plastic mass it may be brought to that state by, depending upon the state in which it does exist, either the addition of or the removal therefrom of water, then molded or otherwise formed into a product or products of desired shape, dried, and finally baked or roasted to obtain a hard end-product of the desired physical and other characteristics.

I am well aware that it has long been common practice to treat certain shaped and baked argillaceous substances with steam in order to age and to harden them. It is emphasized, however, that with the treatment of a shaped and baked argillaceous substance for the purpose of more quickly or more effectively hardening it this invention has naught to do.

Other modifications of my invention include a process in which a body of high pressure elastic fluid, preferably hot elastic fluid composed of or containing water vapor, such as steam at a pressure of at least 200 pounds per square inch, and preferably thereabove, is continuously maintained and argillaceous substance in either crushed or in finely divided state is forced thereinto in a discontinuous or intermittent manner, and said elastic fluid and argillaceous substance discharged either continuously or intermittently; or it may include a process in which the argillaceous substance is forced continuously into a continuously maintained body of hot elastic fluid of the kind or kinds immediately hereinbefore described and said elastic fluid and argillaceous substance then discharged intermittently. In most cases end-pressures of the steam treatment above about 800 pounds per square inch, for example, about 1000 pounds per square inch or thereabove, are preferred, since thereby the time of the treatment may be shortened.

In accordance with the provisions of the patent statutes, I have hereinbefore described the best mode or modes now known to me of carrying this invention into effect; but I desire it to be distinctly understood that I fully realize that changes may be made therein and that I intend to include within the scope of the claims that follow hereinafter all modifications that do not depart substantially from the spirit of the invention set forth therein and thereby.

What I claim is:

1. The improved process of treating an argillaceous substance having a low plasticity in order to increase the plasticity thereof, which consists in subjecting the same, in a closed chamber built to withstand substantial pressure, to the action of elastic fluid comprising water vapor, under a pressure exceeding about 200 pounds per square inch and at a temperature exceeding 212° Fahrenheit, and progressively forcing the argillaceous substance out through a relatively constricted opening in the chamber while maintaining a pressure substantially above atmospheric within said chamber.

2. The improved process of treating an argillaceous substance having a low plasticity in order to increase the plasticity thereof, which consists in placing said substance in a closed chamber built to withstand substantial pressure, subjecting the same to penetration by elastic fluid comprising water vapor under a pressure of about 200 to 400 pounds per square inch and at a temperature exceeding 212° Fahrenheit in order to preheat said starting argillaceous substance, subjecting the preheated material to the action of elastic fluid comprising water vapor, under a pressure of about 500 to 1500 pounds per square inch and at a temperature exceeding 212° Fahrenheit, and then discharging the contents of the chamber through a constricted orifice while maintaining a pressure substantially above atmospheric within said chamber.

3. The improved process of treating an argillaceous substance having a low plasticity in order to increase the plasticity thereof, which consists in subjecting the same, in a closed chamber built to withstand substantial pressure, to penetration by steam under a pressure of about 200 to 400 pounds per square inch in order to preheat said starting argillaceous substance, subjecting the preheated material to the action of steam under a pressure of about 500 to 1500 pounds per square inch, and then, while maintaining a pressure substantially above atmospheric within said chamber, releasing the argillaceous substance through a constricted opening in the chamber wall into a region where the pressure is approximately atmospheric.

4. The improved process of treating an argillaceous substance having a low plasticity in order to increase the plasticity thereof, which consists in placing said substance in a closed chamber built to withstand substantial pressure, subjecting the same to the action of steam under a pressure exceeding about 200 pounds per square inch, progressively forcing the argillaceous substance out of said chamber through a narrow opening in the chamber wall while maintaining a pressure substantially above atmospheric within said chamber, and bringing the ejected argillaceous substance and steam into contact with water, whereby the steam is condensed and a substantial increase in the plasticity of the argillaceous substance is effected.

5. The improved process of treating an argillaceous substance having a low plasticity in order to increase the plasticity thereof, which consists in moistening the subdivided argillaceous substance, subjecting the moistened material, in a closed chamber built to withstand substantial pressure, to penetration by steam under a pressure of about 200 to 400 pounds per square inch in order to preheat said starting argillaceous substance, subjecting the preheated material to the action of steam under a pressure of about 500 to 1500 pounds per square inch, and progressively ejecting the steam-treated material through a narrow outlet in the chamber while maintaining a pressure substantially above atmospheric within said chamber.

6. The improved process of increasing the plasticity of an argillaceous substance having a low plasticity, which comprises: maintaining, in a chamber built to withstand substantial pressure, a body of steam under a pressure exceeding about 200 pounds per square inch, forcing the argillaceous substance to be treated into said body of steam in said chamber, continuously discharging therefrom, through a constricted discharge opening, steam and argillaceous substance into a region of substantially lower pressure than that at which the argillaceous substance previously had been treated, and bringing the steam and argillaceous substance into contact with water, whereby the steam is condensed and a substantial increase in the plasticity of the argillaceous substance is effected.

7. The improved process of increasing the plasticity of an argillaceous substance having a low plasticity, which comprises: preheating the starting argillaceous substance by subjecting it, in a closed chamber built to withstand substantial pressure, to penetration by elastic fluid under a pressure exceeding about 200 pounds per square inch and at a temperature exceeding 212° Fahrenheit, maintaining, in a closed chamber built to withstand substantial pressure, a body of steam under a pressure exceeding about 350 pounds per square inch, continuously forcing the preheated argillaceous substance into said body of steam in said chamber, and continuously discharging therefrom, through a constricted discharge opening, steam and argillaceous substance into a region of substantially lower pressure than the maximum pressure to which the argillaceous substance had been subjected immediately prior to discharge from said chamber.

8. The process of improving the useful properties of an oil-decolorizing clay, which consists in enveloping the oil-decolorizing clay in elastic fluid comprising water vapor, at a temperature exceeding 212° Fahrenheit and under a pressure exceeding about 200 pounds per square inch, and then suddenly releasing such pressure so as to explosively expand the oil-decolorizing clay and thereby to effect a substantial improvement in its useful properties.

9. The process of rehydrating and simultaneously improving the useful properties of a comminuted, dehydrated fuller's earth, which consists in moistening the same, subjecting the moistened material, in a closed chamber built to withstand substantial pressure, to the action of steam under a pressure of about 350 to 1500 pounds per square inch, and then suddenly releasing such pressure.

10. The process of improving the useful properties of a fuller's earth, which consists in placing said substance in subdivided state in a closed chamber built to withstand substantial pressure, subjecting the material in said chamber to the action of steam under a pressure of about 350 to 1500 pounds per square inch, and progressively ejecting the steam-treated fuller's earth through a narrow outlet in the chamber while maintaining a pressure substantially above atmospheric within said chamber.

11. Subdivided earthy cellular adsorbent having the characteristic properties resulting from its explosive expansion and wherein the total active, working surfaces of a given weight of the adsorbent are more than the total active, working surfaces of the same given weight of starting material before subjection of the latter to explosive expansion.

12. Explosively expanded fuller's earth wherein the adsorbing surface of individual cells of the earth is more than the same surface of the individual cells of the material before subjection of the latter to explosive expansion.

13. Explosively expanded fuller's earth in comminuted state wherein the adsorbing surface of individual cells of individual particles of the earth is more than the same surface of individual cells of the starting fuller's earth before subjection of the latter to explosive expansion, said explosively expanded fuller's earth in comminuted state being further characterized by its freedom from impurities removable by steam under a pressure exceeding about 200 pounds per square inch.

14. A method of making an improved agent for the purification of substances by adsorption from earthy cellular adsorbent in subdivided state which comprises subjecting the starting adsorbent at a temperature exceeding 212° Fahrenheit to penetration by elastic fluid under a pressure exceeding about 200 pounds per square inch and then suddenly releasing the pressure so as to explosively expand the adsorbent, reducing the explosively expanded adsorbent to a plastic mass of the desired consistency, compressing the plastic mass, and removing excess water from the compressed mass.

15. A method of making an improved agent for the purification of substances by adsorption from fuller's earth in subdivided state which comprises enveloping the starting fuller's earth in elastic fluid comprising water vapor, at a temperature exceeding 212° Fahrenheit and under a pressure exceeding about 200 pounds per square inch, and then suddenly releasing such pressure so as to explosively expand said fuller's earth, reducing the explosively expanded fuller's earth to a plastic mass of the desired consistency, compressing the plastic mass by extrusion through an orifice under pressure, and subjecting the compressed fuller's earth to a heat treatment to remove excess water therefrom.

HAROLD L. KAUFFMAN.